(12) United States Patent
Gao et al.

(10) Patent No.: US 8,304,361 B2
(45) Date of Patent: Nov. 6, 2012

(54) REDUCED REACTOR FOULING

(75) Inventors: Xiaoliang Gao, Calgary (CA); Benjamin Milton Shaw, Calgary (CA); Cliff Robert Baar, Calgary (CA)

(73) Assignee: NOVA Chemical (International) S.A., Fribourg (CH)

( * ) Notice: Subject to any disclaimer, the term of this patent is extended or adjusted under 35 U.S.C. 154(b) by 10 days.

(21) Appl. No.: 13/068,600

(22) Filed: May 16, 2011

(65) Prior Publication Data

US 2011/0288248 A1 Nov. 24, 2011

(30) Foreign Application Priority Data

May 21, 2010 (CA) .................................. 2704934

(51) Int. Cl.
*C08F 4/6592* (2006.01)
*C08F 4/02* (2006.01)
*C08F 4/602* (2006.01)
*B01J 31/22* (2006.01)

(52) U.S. Cl. ........ 502/152; 502/103; 502/120; 502/162; 526/129; 526/160; 526/165; 526/348; 526/943

(58) Field of Classification Search .................. 502/103, 502/120, 152, 162; 526/129, 160, 165, 348, 526/943
See application file for complete search history.

(56) References Cited

U.S. PATENT DOCUMENTS

| | | |
|---|---|---|
| 3,917,466 A | 11/1975 | Henry, Jr. et al. |
| 4,182,810 A | 1/1980 | Wilcox |
| 4,325,849 A | 4/1982 | Rosen et al. |
| 5,684,097 A | 11/1997 | Palmroos et al. |
| 5,965,677 A * | 10/1999 | Stephan et al. ............... 526/129 |
| 6,117,955 A | 9/2000 | Agapiou et al. |
| 6,140,432 A | 10/2000 | Agapiou et al. |
| 6,271,325 B1 | 8/2001 | McConville et al. |
| 6,281,306 B1 | 8/2001 | Oskam et al. |
| 6,562,924 B2 | 5/2003 | Benazouzz et al. |
| 6,639,028 B2 | 10/2003 | Heslop et al. |
| 6,646,074 B2 | 11/2003 | Herzog et al. |
| 6,653,416 B2 | 11/2003 | McDaniel et al. |
| 6,734,266 B2 | 5/2004 | Gao et al. |
| 7,001,962 B2 | 2/2006 | Gao et al. |
| 7,005,400 B2 | 2/2006 | Takahashi |
| 7,273,912 B2 | 9/2007 | Jacobsen et al. |
| 7,442,750 B2 | 10/2008 | Jacobsen et al. |
| 2006/0189769 A1* | 8/2006 | Hoang et al. .................. 526/129 |

OTHER PUBLICATIONS

J.B. Peri et al, The surface structure of silica gel, J. Phys. Chem., 1968, p. 2926-2933, 72(8).

* cited by examiner

*Primary Examiner* — Caixia Lu
(74) *Attorney, Agent, or Firm* — Kenneth H. Johnson

(57) ABSTRACT

Fouling in a dispersed phase reactor in the presence of a phosphinimine catalyst and MAO may be reduced by reducing the loading of the phosphinimine catalyst to provide from 0.02 to 0.031 mmol of transition M per g of catalyst while still maintaining a productivity of not less than 2500 g of polymer/gram of catalyst. The catalyst may optionally be used in the presence of an antistatic agent.

21 Claims, No Drawings

REDUCED REACTOR FOULING

FIELD OF THE INVENTION

Single site catalysts tend to be very reactive which leads to high productivity but may also cause problems with fouling. Particularly during the first few minutes of catalyst activation the productivity may be so high that the heat of reaction may be so high as to cause the polymer to become sticky/tacky leading to formation of agglomerates and sheeting and fouling. This is not a problem during solution phase polymerization as the operator wants the polymer to be dissolved in the solution. However, in a discontinuous phase polymerization such as gas phase (stirred bed or fluidized bed) or slurry polymerization the problem may be acute.

BACKGROUND OF THE INVENTION

Single site catalysts for the polymerization of alpha olefins were introduced in the mid 1980's. These catalysts are more active than the prior Ziegler Natta catalysts, which may lead to issues of polymer agglomeration. Additionally, static may contribute to the problem. As a result reactor continuity (e.g. fouling and also catalyst life time) may be a problem.

Co pending Canadian patent application (and unpublished as the date of filing this application) 2,683,019 filed Oct. 20, 2009 in the names of Gao et al, assigned to NOVA Chemicals teaches a method for improving the continuity of a phosphinimine substituted cyclopentadienyl catalyst for the dispersed phase phase polymerization of olefins. The support is treated with a metal salt selected from the group consisting of $Zr(SO_4)_2 \cdot 4H_2O$, $ZrO(NO_3)_2$ and $Fe(NO_3)_3$ to provide not less than 1 weight % based on the weight of the support of said salt. Then MAO and a phosphinimine catalyst are added to the support in "conventional amounts". The patent exemplifies the use of tri-tertary butyl phosphinimine 1-pentafluoraphenyl cyclopentadiene titanium dichloride catalyst. In Example 3 the amount of catalyst used is reduced by about 33% and a good result is obtained. However, one conclusion drawn was the ratio of peak height of ethylene consumption in the first 10 minutes to the average ethylene consumption during the time from 10 to 60 minutes is independent of the amount of catalyst used per reaction. While it was observed for that particular catalyst it does not suggest the same would happen for other catalysts. The present invention is a selection of loading rates and specific substitutents in the phosphinimine catalyst to achieve a good productivity with reduced fouling.

U.S. Pat. No. 6,734,266 issued May 11, 2004 to Gao et al., assigned to NOVA Chemicals (International) S.A. teaches sulfating the surface of porous inorganic support with an acid, amide or simple salt such as an alkali or alkaline earth metal sulphate. The resulting treated support may be calcined. Aluminoxane and a single site catalyst are subsequently deposited on the support. The resulting catalyst shows improved activity. However, the patent fails to teach or suggest depositing zirconium sulphate on a silica support, nor does it suggest using an untreated support.

U.S. Pat. No. 7,001,962 issued Feb. 21, 2006 to Gao et al., assigned to NOVA Chemicals (International) S.A. teaches treating a porous inorganic support with a zirconium compound including zirconium sulphate and an acid such as a fluorophosphoric acid, sulphonic acid, phosphoric acid and sulphuric acid. The support is dried and may be heated under air at 200° C. and under nitrogen up to 600° C. Subsequently a trialkyl aluminum compound (e.g. triethyl aluminum) or an alkoxy aluminum alkyl compound (e.g. diethyl aluminum ethoxide) and a single site catalyst are deposited on the support. The specification teaches away from using aluminoxane compounds. The activity of these supports is typically lower than the activity of the catalyst of U.S. Pat. No. 6,734,266 (compare Table 5 of U.S. Pat. No. 7,001,962 with Table 2 of U.S. Pat. No. 6,734,266).

U.S. Pat. No. 7,273,912 issued Sep. 25, 2007 to Jacobsen et al., assigned to Innovene Europe Limited, teaches a catalyst which is supported on a porous inorganic support which has been treated with a sulphate such as ammonium sulphate or an iron, copper, zinc, nickel or cobalt sulphate. The support may be calcined in an inert atmosphere at 200 to 850° C. The support is then activated with an ionic activator and then contacted with a single site catalyst. The patent fails to teach aluminoxane compounds as activators.

U.S. Pat. No. 7,005,400 issued Feb. 28, 2006 to Takahashi assigned to Polychem Corporation teaches a combined activator support comprising a metal oxide support and a surface coating of a group 2, 3, 4, 13 and 14 oxide or hydroxide different from the carrier. The support is intended to activate the carrier without the conventional "activators". However, in the examples the supported catalyst is used in combination with triethyl aluminum. The triethyl aluminum does not appear to be deposited on the support. Additionally the patent does not teach phosphinimine catalysts.

U.S. Pat. No. 7,442,750 issued Oct. 28, 2008 to Jacobsen et al., assigned to Innovene Europe Limited teaches treating an inorganic metal oxide support typically with a transition metal salt, preferably a sulphate, of iron, copper, cobalt, nickel, and zinc. Then a single site catalyst, preferably a constrained geometry single site catalyst and an activator are deposited on the support. The activator is preferably a borate but may be an aluminoxane compound. The disclosure appears to be directed at reducing static in the reactor bed and product in the absence of a conventional antistatic agent such as STADIS®.

U.S. Pat. No. 6,653,416 issued Nov. 25, 2003 to McDaniel at al., assigned to Phillips Petroleum Company, discloses a fluoride silica-zirconia or titania porous support for a metallocene catalyst activated with an aluminum compound selected from the group consisting of alkyl aluminums, alkyl aluminum halides and alkyl aluminum alkoxides. Comparative examples 10 and 11 show the penetration of zirconium into silica to form a silica-zirconia support. However, the examples (Table 1) show the resulting catalyst has a lower activity than those when the supports were treated with fluoride.

The use of a salt of a carboxylic acid, especially aluminum stearate, as an antifouling additive to olefin polymerization catalyst compositions is disclosed in U.S. Pat. No. 6,271,325 (McConville et al. to Univation) and U.S. Pat. No. 6,281,306 (Oskam et al. to Univation).

The preparation of supported catalysts using an amine antistatic agent, such as the fatty amine sold under the trademark KEMANINE AS-990, is disclosed in U.S. Pat. No. 6,140,432 (Agapiou et al.; to Exxon) and U.S. Pat. No. 6,117,955 (Agapiou et al.; to Exxon).

Antistatic agents are commonly added to aviation fuels to prevent the buildup of static charges when the fuels are pumped at high flow rates. The use of these antistatic agents in olefin polymerizations is also known. For example, an aviation fuel antistatic agent sold under the trademark STA-DIS™ composition (which contains a "polysulfone" copolymer, a polymeric polyamine and an oil soluble sulfonic acid) was originally disclosed for use as an antistatic agent in olefin polymerizations in U.S. Pat. No. 4,182,810 (Wilcox, to Phillips Petroleum). The examples of the Wilcox '810 patent illustrate the addition of the "polysulfone" antistatic agent to the isobutane diluent in a commercial slurry polymerization process. This is somewhat different from the teachings of the earlier referenced patents—in the sense that the carboxylic acid salts or amine antistatics of the other patents were added to the catalyst, instead of being added to a process stream.

The use of "polysulfone" antistatic composition in olefin polymerizations is also subsequently disclosed in:

1) chromium catalyzed gas phase olefin polymerizations, in U.S. Pat. No. 6,639,028 (Heslop et al.; assigned to BP Chemicals Ltd.);

2) Ziegler Natta catalyzed gas phase olefin polymerizations, in U.S. Pat. No. 6,646,074 (Herzog et al.; assigned to BP Chemicals Ltd.); and 3) metallocene catalyzed olefin polymerizations, in U.S. Pat. No. 6,562,924 (Benazouzz et al.; assigned to BP Chemicals Ltd.).

The Benazouzz et al. patent does teach the addition of STADIS™ antistat agent to the polymerization catalyst in small amounts (about 150 ppm by weight). However, in each of the Heslop et al. '028, Herzog et al. '074 and Benazouzz et al. '924 patents listed above, it is expressly taught that it is preferred to add the STADIS™ antistat directly to the polymerization zone (i.e. as opposed to being an admixture with the catalyst).

The present invention seeks to provide a supported phosphinimine substituted olefin polymerization catalyst having a reduced propensity for fouling while still have an acceptable productivity. Optionally these catalysts may be used in conjunction with one or more anti-static agents.

SUMMARY OF THE INVENTION

The present invention provides a supported phosphinimine catalyst having a productivity in a gas phase polymerization greater than 2500 g of polymer per gram of supported catalyst per hour normalized to 1379 kPag (200 psig) of ethylene partial pressure and a temperature of 90° C. as measured in a 2 liter reactor over a period of time from 0 to 60 minutes comprising:

i) a calcined porous particulate inorganic oxide support having an average particle size from 30 to 80 microns, a surface area greater than 250 m²/g, and a pore volume greater than 0.3 ml/g; and ii) from 0.1 to 30 weight % based on the weight of said calcined support of an aluminum compound of the formula

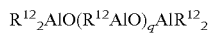

wherein each $R^{12}$ is independently selected from the group consisting of $C_{1-20}$ hydrocarbyl radicals and q is from 3 to 50; and iii) a phoshpinimine catalyst of the formula:

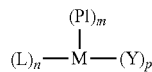

wherein M is selected from the group consisting of Ti, Zr and Hf; PI is a phosphinimine ligand of the formula:

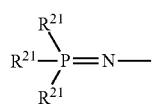

wherein each $R^{21}$ is independently selected from the group consisting of a $C_{1-10}$ hydrocarbyl radicals; L is a monoanionic ligand selected from the group consisting of a cyclopentadienyl ligand which is substituted at the 1 position by a $C_{1-6}$ straight chained alkyl radical and at the 2 position by a $C_6F_5$ radical; Y is independently selected from the group consisting of activatable ligands; m is 1 or 2; n is 0 or 1; p is an integer and the sum of m+n+p equals the valence state of M;

to provide from 0.020 to 0.031 mmol of M per g of catalyst and the weight ratio of aluminum from the aluminum compound to M from the phosphinimine catalyst from 50:1 to 150:1.

In a further embodiment the present invention provides a catalyst having a productivity of greater than 3500 per gram of supported catalyst per hour normalized to 1379 kPag (200 psig) of ethylene partial pressure and a temperature of 90° C.

In a further embodiment the catalyst has a fouling rate of less than 35% as measured under the specified conditions.

In a further embodiment the present invention in the aluminum compound $R^{12}$ is a methyl radical and q is from 10 to 40.

In a further embodiment the present invention provides a catalyst having weight ratio of aluminum from the aluminum compound to M from the phosphinimine catalyst from 75:1 to 140:1.

In a further embodiment the present invention provides a catalyst wherein the cyclopentadienyl ligand is substituted in the 1 position with a radical selected from the group consisting of linear $C_{3-6}$ alkyl radicals.

In a further embodiment the present invention provides a catalyst wherein in the phosphiminine ligand each $R^{21}$ is the same and is selected from the group consisting of $C_{3-6}$ secondary and tertiary alkyl radicals.

In a further embodiment the present invention provides a catalyst wherein M is Ti.

In a further embodiment the present invention provides a catalyst wherein the cyclopentadienyl ligand is substituted at the 2 position by a pentafluorophenyl radical.

In a further embodiment the present invention provides a catalyst wherein in the phosphinimine ligand $R^{21}$ is a tertiary butyl ligand.

In a further embodiment the present invention provides any of the above catalysts where in the support has been impregnated with at least 1, preferably from 1 to 15 weight % of $Zr(SO_4)_2 \cdot 4H_2O$.

In a further embodiment the present invention provides a gas phase polymerization conducted in the presence of a catalyst as described above.

In a further embodiment the present invention provides a slurry phase polymerization conducted in the presence of a catalyst as described above.

The present invention also provides for combinations in whole or in part of the above embodiments together with any further embodiment further described in the detailed description.

DETAILED DESCRIPTION

As used in this specification dispersed phase polymerization means a polymerization in which the polymer is dispersed in a fluid polymerization medium. The fluid may be liquid in which case the polymerization would be a slurry phase polymerization or the fluid could be gaseous in which case the polymerization would be a gas phase polymerization, either fluidized bed or stirred bed.

The term catalyst may refer to the total catalyst (support, MAO and phosphinimine catalytic molecule or species) or the phosphinimine catalytic molecule or species per se. One of ordinary skill in the art will be able to determine in the context of the specification whether it is the total catalyst or the catalytic molecule or species being referred to.

The Support

The support for the catalysts of the present invention comprises a silica oxide substrate having pendant reactive moieties. The reactive moiety may be a siloxyl radical but more typically is a hydroxyl radical. The support should have an average particle size (D-50) from about 30 to 80 microns, preferably from about 40 to 70 microns. The support should have a large surface area typically greater than about 250 m²/g, most preferably from 300 m²/g to 1,000 m²/g. The support will be porous having a pore volume from about 0.3 to 5.0 ml/g, typically from 0.5 to 3.0 ml/g.

It is important that the support be dried prior to the initial reaction with an aluminum activator. Generally, the support may be heated at a temperature of at least 200° C. for up to 24 hours, typically at a temperature from 500° C. to 800° C., preferably from 550° C. to 675° C. for about 2 to 20, preferably 4 to 10 hours. The resulting support will be free of adsorbed water and should have a surface hydroxyl content from about 0.1 to 5 mmol/g of support, preferably from 0.5 to 3 mmol/g of support.

Silica suitable for use as a support in the present invention is amorphous. For example, some commercially available silica's are marketed under the trademark of SYLOPOL® 958, 955 and 2408 by Davison Catalysts a Division of W. R. Grace and Company and ES70 and ES70W by Ineos Silica.

The amount of the hydroxyl groups in silica may be determined according to the method disclosed by J. B. Peri and A. L. Hensley, Jr., in *J. Phys. Chem.*, 72 (8), 2926, 1968, the entire contents of which are incorporated herein by reference.

The resulting support is in the form of a free flowing dry powder.

The Activator

The activator is an aluminum compound (aluminoxane) of the formula $R^{12}{}_2AlO(R^{12}AlO)_qAlR^{12}{}_2$ wherein each $R^{12}$ is independently selected from the group consisting of $C_{1-20}$ hydrocarbyl radicals and q is from 3 to 50. In the aluminum activator preferably $R^{12}$ is a $C_{1-20}$ alkyl radical, preferably a $C_{1-4}$ alkyl radical, most preferably a methyl radical and q is from 10 to 40. Optionally, a hindered phenol may be used in conjunction with the aluminoxane to provide a molar ratio of Al:hindered phenol from 2:1 to 5:1 if the hindered phenol is present. Generally the molar ratio of Al:hindered phenol, if it is present, is from 3.25:1 to 4.50:1. Preferably the phenol is substituted in the 2, 4 and 6 position by a $C_{2-6}$ alkyl radical. Desirably the hindered phenol is 2,6-di-tert-butyl-4-ethylphenol.

The aluminum compounds (aluminoxanes and optionally hindered phenol) are typically used as activators in substantial molar excess compared to the amount of transition metal (e.g. group 4 transition metal) from the catalyst molecules. Aluminum:transition metal (in the catalyst) molar ratios may range from 50:1 to 150:1, preferably 75:1 to 140:1 especially from 80:1 to 130:1.

Typically the loading of the alminoxane compound may range from 0.01 up to 30 weight % preferably from 0.1 to 2 weight %, most preferably from 0.15 to 1.75 weight % based on the weight of the calcined support.

The aluminoxane is added to the support in the form of a hydrocarbyl solution, typically at a 5 to 30 weight % solution, preferably an 8 to 12 weight % solution, most preferably a 9 to 10 weight % solution. Suitable hydrocarbon solvents include $C_{5-12}$ hydrocarbons which may be unsubstituted or substituted by $C_{1-4}$ alkyl group such as pentane, hexane, heptane, octane, cyclohexane, methylcyclohexane, toluene, or hydrogenated naphtha. An additional solvent is Isopar E ($C_{8-12}$ aliphatic solvent, Exxon Chemical Co.).

The treated support may optionally be filtered and/or dried under an inert atmosphere (e.g. $N_2$) and optionally at reduced pressure, preferably at temperatures from room temperature up to about 80° C.

The optionally dried support with activator is then contacted with the catalyst in a hydrocarbyl solution as noted above.

In an alternate embodiment the support could be treated with a combined solution of activator and catalyst.

The Catalyst

The catalyst is a single site catalyst of the formula:

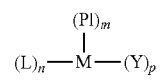

wherein M is selected from the group consisting of Ti, Zr and Hf; PI is a phosphinimine ligand of the formula

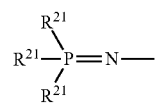

wherein each $R^{21}$ is independently selected from the group consisting of a $C_{1-10}$ alkyl radical, preferably a $C_{3-4}$ secondary or tertiary alkyl radical, most preferably a t-butyl radical; L is a monoanionic cyclopentadienyl-type ligand which is substituted at the 1 position by a $C_{1-6}$ straight chained alkyl radical and at the 2 position by a $C_6F_5$ radical. Y is independently selected from the group consisting of activatable ligands; m is 1 or 2; n is 0 or 1; p is an integer and the sum of m+n+p equals the valence state of M.

The preferred phosphinimines are those in which each $R^{21}$ is a hydrocarbyl radical, preferably a $C_{1-6}$ hydrocarbyl radical, most preferably a $C_{1-4}$ hydrocarbyl radical, desirably a t-butyl radical.

The term "cyclopentadienyl" refers to a 5-member carbon ring having delocalized bonding within the ring and typically being bound to the active catalyst site, generally a group 4 metal (M) through $\eta^5$-bonds. The cyclopentadienyl ligand is substituted at the 1 position by a $C_{1-6}$, preferably a $C_{3-6}$ straight chained alkyl radical and substituted at the 2 position by a pentafluorophenyl radical ($C_6F_5$) (e.g. a nucleophilic type radical—electron rich).

Preferably the cyclopentadienyl-type ligand is selected from the group consisting of a cyclopentadienyl radical 1-n-hexyl, 2 pentafluorophenyl cyclopentadienyl, and 1-n-propyl, 2-pentafluorophenyl cyclopentadienyl ligands.

Activatable ligands Y may be selected from the group consisting of a halogen atom, $C_{1-4}$ alkyl radicals, $C_{6-20}$ aryl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals. Preferably, Y is selected from the group consisting of a chlorine atom, a methyl radical, an ethyl radical and a benzyl radical.

Preferably M is Ti.

The loading of the catalyst on the support should be such to provide from about 0.020 to 0.031 mmol, preferably from 0.025 to 0.0305 mmol of group IV metal (e.g. Ti) from the catalysts per gram of catalyst (support optionally treated with metal salt (e.g. Zr(SO$_4$)$_2$.4H$_2$O) see below) and calcined and treated with an activator and catalyst).

The molar ratio of aluminum (from the MAO):transition metal (in the catalytic molecule or species) may be from 50:1 to 150:1, preferably 75:1 to 140:1 especially from 90:1 to 120:1. However, as the loading of phosphinimine catalyst has been reduced this leads to a lower level of MAO for the supported catalyst, even if the molar ratios of Al:transition metal were the same, resulting in a further reduction of cost and enhancing of the cost of the catalyst.

Deposition of the Zr(SO$_4$)$_2$.4H$_2$O

The support may be treated with a solution of Zr(SO$_4$)$_2$.4H$_2$O to provide from 2 to 50, preferably a 5 to 15, most preferably an 8 to 12, desirably a 9 to 11 weight % of Zr (SO$_4$)$_2$.4H$_2$O. The dry support is contacted with the solution, typically about 2 to 10 weight % of the Zr(SO$_4$)$_2$.4H$_2$O at a temperature from 10° C. to 50° C., preferably from 20 to 30° C., for a time of not less than 30 minutes, typically from 1 to 10 hours, preferably from 1 to 4 hours, until the support is thoroughly impregnated with the solution.

The impregnated support is then recovered typically by drying at an elevated temperature from 100° C. to 150° C., preferably from 120° C. to 140° C., most preferably from 130° C. to 140° C., for about 8 to 12 hours (e.g. overnight). Other recovery methods would be apparent to those skilled in the art. The dried impregnated support is then calcined as described above, in an inert atmosphere preferably at a temperature from 500° C. to 800° C., preferably from 550° C. to 675° C. for about 2 to 20, preferably 4 to 10 hours. The Zr(SO$_4$)$_2$ is substantially unchanged when calcined at or below 600° C. Less than 3% is converted to the metal oxide (e.g. ZrO$_2$) (e.g. the water of hydration has been driven off by calcining).

The resulting dried and calcined support is then contacted sequentially with the activator and the catalyst in an inert hydrocarbon diluent as described above.

Antistatic

While the present catalyst system results in reduced rates of fouling it is believed that the fouling may be further reduced through the use of an anti-static agent either on the catalyst or in the reactor.

The present invention can be carried out in the presence of any suitable anti-static agent or agents. The use of anti-static agents in a gas phase or slurry phase polymerization process is well known in the art. By way of example only, some non-limiting anti-static agents that can be used are polysulfone materials, sulphonates, polymeric polyamines, ethoxylated amines (e.g. Kemamaine AS-990™ which is available from Ciba) or metal carboxylate salts.

In one embodiment the antistatic is added directly to the supported catalyst. The antistatic may be added in an amount from 0 (e.g. optionally) up to 150,000 parts per million (ppm), preferably from 15,000 up to 120,000 ppm based on the weight of the supported catalyst.

In a further embodiment the antistatic may be added to the reactor in an amount from 0 to 100, preferably from 10 to 80 ppm based on the weight of the polymer produced (i.e. the weight of polymer in the fluidized bed or the weight of polymer dispersed in the slurry phase reactor). If present the antistatic agent may be present in an amount from about 0 to 100, preferably from about 10 to 80 most preferably from 20 to 50 ppm based on the weight of polymer. From the productivity of the catalyst it is fairly routine to determine the feed rate of the antistatic to the reactor based on the catalyst feed rate.

Antistatic "Polysulfone" Additive

The antistatic polysulfone additive comprises at least one of the components selected from:
(1) a polysulfone copolymer;
(2) a polymeric polyamine; and
(3) an oil-soluble sulfonic acid, and, in addition, a solvent for the polysulfone copolymer.

Preferably, the antistatic additive comprises at least two components selected from above components (1), (2) and (3). More preferably, the antistatic additive comprises a mixture of (1), (2) and (3).

According to the present invention, the polysulfone copolymer component of the antistatic additive (often designated as olefin-sulfur dioxide copolymer, olefin polysulfones, or poly(olefin sulfone)) is a polymer, preferably a linear polymer, wherein the structure is considered to be that of alternating copolymers of the olefins and sulfur dioxide, having a one-to-one molar ratio of the comonomers with the olefins in head to tail arrangement. Preferably, the polysulfone copolymer consists essentially of about 50 mole percent of units of sulfur dioxide, about 40 to 50 mole percent of units derived from one or more 1-alkenes each having from about 6 to 24 carbon atoms, and from about 0 to 10 mole percent of units derived from an olefinic compound having the formula ACH=CHB where A is a group having the formula —(C$_x$H$_{2x}$)—COOH wherein x is from 0 to about 17, and B is hydrogen or carboxyl, with the provision that when B is carboxyl, x is 0, and wherein A and B together can be a dicarboxylic anhydride group.

Preferably, the polysulfone copolymer employed in the present invention has a weight average molecular weight in the range 10,000 to 1,500,000, preferably in the range 50,000 to 900,000. The units derived from the one or more 1-alkenes are preferably derived from straight chain alkenes having 6-18 carbon atoms, for example 1-hexene, 1-heptene, 1-octene, 1-decene, 1-dodecene, 1-hexadecene and 1-octadecene. Examples of units derived from the one or more compounds having the formula ACH=CHB are units derived from maleic acid, acrylic acid, 5-hexenoic acid.

A preferred polysulfone copolymer is 1-decene polysulfone having an inherent viscosity (measured as a 0.5 weight percent solution in toluene at 30° C.) ranging from about 0.04 dl/g to 1.6 dl/g.

The polymeric polyamines that can be suitably employed in the antistatic of the present invention are described in U.S. Pat. No. 3,917,466, in particular at column 6 line 42 to column 9 line 29.

The polyamine component in accordance with the present invention has the general formula:

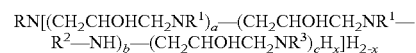

wherein R$^1$ is an aliphatic hydrocarbyl group of 8 to 24 carbon atoms, R$^2$ is an alkylene group of 2 to 6 carbon atoms, R$^3$ is the group R2-HNR$^1$, R is R$^1$ or an N-aliphatic hydrocarbyl alkylene group having the formula R$^1$NHR$^2$; a, b and c are integers from 0 to 20 and x is 1 or 2; with the provision that when R is R$^1$ then a is greater than 2 and b=c=0, and when R is R$^1$NHR$^2$ then a is 0 and the sum of b+c is an integer from 2 to 20.

The polymeric polyamine may be prepared for example by heating an aliphatic primary monoamine or N-aliphatic hydrocarbyl alkylene diamine with epichlorohydrin in the molar proportion of from 1:1 to 1:1.5 at a temperature of 50° C. to 100° C. in the presence of a solvent, (e.g. a mixture of xylene and isopropanol) adding a strong base, (e.g. sodium hydroxide) and continuing the heating at 50 to 100° C. for about 2 hours. The product containing the polymeric polyamine may then be separated by decanting and then flashing off the solvent.

The polymeric polyamine is preferably the product of reacting an N-aliphatic hydrocarbyl alkylene diamine or an aliphatic primary amine containing at least 8 carbon atoms and preferably at least 12 carbon atoms with epichlorohydrin. Examples of such aliphatic primary amines are those derived from tall oil, tallow, soy bean oil, coconut oil and cotton seed oil. The polymeric polyamine derived from the reaction of tallowamine with epichlorohydrin is preferred. A method of preparing such a polyamine is disclosed in U.S. Pat. No. 3,917,466, column 12, preparation B.1.0

The above-described reactions of epichlorohydrin with amines to form polymeric products are well known and find extensive use in epoxide resin technology.

A preferred polymeric polyamine is a 1:1.5 mole ratio reaction product of N-tallow-1,3-diaminopropane with epichlorohydrin. One such reaction product is "Polyflo™ 130" sold by Universal Oil Company.

According to the present invention, the oil-soluble sulfonic acid component of the antistatic is preferably any oil-soluble sulfonic acid such as an alkanesulfonic acid or an alkylarylsulfonic acid. A useful sulfonic acid is petroleum sulfonic acid resulting from treating oils with sulfuric acid.

Preferred oil-soluble sulfonic acids are dodecylbenzenesulfonic acid and dinonylnaphthylsulfonic acid.

The antistatic additive preferably comprises 1 to 25 weight % of the polysulfone copolymer, 1 to 25 weight % of the polymeric polyamine, 1 to 25 weight % of the oil-soluble sulfonic acid and 25 to 95 weight % of a solvent. Neglecting the solvent, the antistatic additive preferably comprises about 5 to 70 weight % polysulfone copolymer, 5 to 70 weight % polymeric polyamine and 5 to 70 weight % oil-soluble sulfonic acid and the total of these three components is preferably 100%.

Suitable solvents include aromatic, paraffin and cycloparaffin compounds. The solvents are preferably selected from among benzene, toluene, xylene, cyclohexane, fuel oil, isobutane, kerosene and mixtures thereof.

According to a preferred embodiment of the present invention, the total weight of components (1), (2), (3) and the solvent represents essentially 100% of the weight of the antistatic additive.

One useful composition, for example, consists of 13.3 weight % 1:1 copolymer of 1-decene and sulfur dioxide having an inherent viscosity of 0.05 determined as above, 13.3 weight % of "Polyflo™ 130" (1:1.5 mole ratio reaction product of N-tallow-1,3-diaminopropane with epichlorohydrin), 7.4 weight % of either dodecylbenzylsulfonic acid or dinonylnaphthylsulfonic acid, and 66 weight % of an aromatic solvent which is preferably toluene or kerosene.

Another useful composition, for example, consists of 2 to 7 weight % 1:1 copolymer of 1-decene and sulfur dioxide having an inherent viscosity of 0.05 determined as above, 2 to 7 weight % of "Polyflo™ 130" (1:1.5 mole ratio reaction product of N-tallow-1,3-diaminopropane with epichlorohydrin), 2 to 8 weight % of either dodecylbenzylsulfonic acid or dinonylnaphthylsulfonic acid, and 78 to 94 weight % of an aromatic solvent which is preferably a mixture of 10 to 20 weight % toluene and 62 to 77 weight % kerosene.

According to one embodiment of the present invention, the antistatic is a material sold by Octel under the trade name STADIS™, preferably STADIS™ 450, more preferably STADIS™ 425.

Gas Phase Polymerization

Any of the above noted catalyst may be use in a gas phase polymerization. The gas phase reaction may be a fluidized bed gas phase reactor or a stirred bed gas phase reactor.

Fluidized bed gas phase reactors to make polyethylene are generally operated at low temperatures from about 50° C. up to about 120° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

Gas phase polymerization of olefins is well known. Typically, in the gas phase polymerization of olefins (such as ethylene) a gaseous feed stream comprising of at least about 80 weight % ethylene and the balance one or more $C_{3-6}$ copolymerizable monomers typically, 1-butene, or 1-hexene or both, together with a ballast gas such as nitrogen, optionally a small amount of $C_{1-2}$ alkanes (i.e. methane and ethane) and further optionally a molecular weight control agent (typically hydrogen) is fed to a reactor and in some cases a condensable hydrocarbon (e.g. a $C_{4-6}$ alkane such as pentane). Typically, the feed stream passes through a distributor plate at the bottom of the reactor and vertically traverses a bed of polymer particles with active catalyst, typically a fluidized bed but the present invention also contemplates a stirred bed reactor. A small proportion of the olefin monomers in the feed stream react with the catalyst. The unreacted monomer and the other non-polymerizable components in the feed stream exit the bed and typically enter a disengagement zone where the velocity of the feed stream is reduced so that entrained polymer falls back into the fluidized bed. Typically the gaseous stream leaving the top of the reactor is then passed through a compressor. The compressed gas is then cooled by passage through a heat exchanger to remove the heat of reaction. The heat exchanger may be operated at temperatures below about 65° C., preferably at temperatures from 20° C. to 50° C. If there is a condensable gas it is usually condensed and entrained in the recycle stream to remove heat of reaction by vaporization as it recycles through the fluidized bed.

Polymer is removed from the reactor through a series of vessels in which monomer is separated from the off gases. The polymer is recovered and further processed. The off gases are fed to a monomer recovery unit. The monomer recovery unit may be selected from those known in the art including a distillation tower (i.e. a $C_2$ splitter), a pressure swing adsorption unit and a membrane separation device. Ethylene and hydrogen gas recovered from the monomer recovery unit are fed back to the reactor. Finally, make up feed stream is added to the reactor below the distributor plate.

Stirred bed gas phase reactors are operated in a comparable manner except the bed need not be vertical, it may be horizontal and rather than being fluidized by the gas flow it is stirred by a number of agitators inside the reaction zone.

Slurry Polymerization

Any of the above catalysts may be used in a slurry polymerization.

Slurry processes are conducted in the presence of a hydrocarbon diluent such as an alkane (including isoalkanes), an aromatic or a cycloalkane. The diluent may also be the alpha olefin comonomer used in copolymerizations. Preferred alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 110° C. typically from about 10° C. to 80° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase.

The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

The above catalyst may be used in a combined slurry gas phase polymerization where one reaction is conducted in tandem with an other such as a preliminary slurry reaction followed by a gas phase polymerization.

The Polymer

The resulting polymer may have a density from about 0.910 g/cc to about 0.960 g/cc. The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine stabilizers (HALS); process aids such as fatty acids or their derivatives and fluoropolymers optionally in conjunction with low molecular weight esters of polyethylene glycol.

EXAMPLES

The present invention will now be illustrated by the following non limiting examples.

Example 1

Experimental Procedure

The catalyst used in the experiments was a titanium (IV) complex having one tri(tertiary butyl) phosphinimine ligand, two chloride ligands, and a cyclopentadienyl ligand selected from the group of cyclopentadienyl (Cp-$C_6F_5$ comparative); pentafluorophenyl-cyclopentadienyl ($C_6F_5$Cp); 1-n-hexyl,2-pentafluorophenylcyclopentadienyl (1-nHex, 2-$C_6F_5$Cp) and 1-n-propyl,2-pentafluorophenylcyclopentadienyl (1-nPro, 2-$C_6F_5$Cp) ligands.

The aluminoxane was a 10% MAO solution in toluene supplied by Albemarle.

Except for one case the support was silica SYLOPOL® 2408 or SYLOPOL 948 obtained from W. R. Grace. The SYLOPOL 948 support has a larger average particle size ($D_{50}$) than that of SYLOPOL 2408. The average particle size of SYLOPOL 948 is 56 microns.

Preparation of the Support

In embodiments where the support was not treated with $Zr(SO_4)_2.4H_2O$ the support was dried under an inert gas at a temperature of 600-800° C. for a time from 6 to 8 hours.

The following procedure was used in embodiments where the support was treated with $Zr(SO_4)_2.4H_2O$.

An aqueous solution of a $Zr(SO_4)_2.4H_2O$ was prepared. The metal salt solution was impregnated into the support by incipient wetness impregnation procedure. The solid support was dried in air at about 135° C. to produce a free flowing powder. The resulting powder was subsequently dried in air at 200° C. for about 2 hours under air and then under nitrogen at 600° C. for 6 hours. The loading of $Zr(SO_4)_2.4H_2O$ on the support was 10 wt %.

The resulting modified support was slurried in deoxygenated and dried toluene and contacted with a solution of aluminoxane in deoxygenated and dried toluene. The slurry was vibrated on a shaker for 1 hour and then contacted with a solution of catalyst and stirred for two hours to provide a molar ratio of Al:Ti of 120:1 to 90:1. The resulting slurry was filtered and the solid catalyst dried under vacuum and sieved.

The loading of the catalyst (mg of Ti g of support) was controlled and this was backed into the catalyst preparation procedure to determine the loading of MAO on the support prior to adding the catalyst to get the required Al:Ti ratio.

Polymerization

General procedures: All polymerization work was conducted by using a 2 liter, stirred, autoclave reactor running in a gas phase mode of operation. Polymerizations were conducted at temperatures from 80° C. to 100° C., as noted in the tables, at a total reaction pressure of 200 pounds per square inch gauge ("psig"). (This is an ethylene partial pressure of about 197 psig.) A seed bed of dry NaCl (160 g) was used. Typically from 0.4 to 1 ml of a 25% solution of tri-isobutyl aluminum (TIBAL) was used as a poison scavenger (to provide a molar ratio of Al from the scavenger to transition metal in the catalyst (Ti) of about 500:1). Hexene was injected into the reactor to provide about 0.019 molar hexene concentration in the reactants. The reactants comprised 0.43 to 0.5 molar ethylene.

After the addition of scavenger (and optionally, co-monomer), ethylene was used to push the catalyst system into the reactor and to bring the reactor pressure to the total pressure of 200 psig. At the end of the reaction the % conversion to polymer (PE Yield g of polymer produced), productivity (grams of polymer per gram of transition metal in the catalyst), the loading of the catalytic species on the catalyst (mmol of Ti per g of total catalyst) and fouling were measured. Fouling was measured by collecting the polymer from the reactor (including lumps, and sheeted material) and sieving through a number 14 sieve (1.4 mm openings) the product (lightly brushing but not "pushing" product through) to determine weight % of the polymer did not pass through the sieve as a % of the total polymer produced. The results are set forth in Tables 1, 2 and 3 below.

TABLE 1

| Run | CP Ligand in the catalyst on support and Al(MAO):Ti mole ratio | Rx Temp ° C. | Amount of Catalyst mg | PE Yield g | Productivity g PE/g of catalyst | Catalyst loading mmol of Ti/g of cat | Fouling % |
|---|---|---|---|---|---|---|---|
| 1 | Cp-$C_6F_5$ on $Zr(SO_4)_2$•$4H_2O$ 10% on SYLOPOL 2408 (90:1) | 90 | 32 | 71.7 | 2241 | 0.0355 | 41 |

TABLE 1-continued

| Run | CP Ligand in the catalyst on support and Al(MAO):Ti mole ratio | Rx Temp °C. | Amount of Catalyst mg | PE Yield g | Productivity g PE/g of catalyst | Catalyst loading mmol of Ti/g of cat | Fouling % |
|---|---|---|---|---|---|---|---|
| 2 | Cp-$C_6F_5$ on $Zr(SO_4)_2 \cdot 4H_2O$ 10% on SYLOPOL 2408 (90:1) | 90 | 32 | 107.4 | 3356 | 0.0355 | 96.3 |
| 3 | Cp-$C_6F_5$ on $Zr(SO_4)_2 \cdot 4H_2O$ 10% on SYLOPOL 2408 (90:1) | 90 | 31 | 99.2 | 3200 | 0.0355 | 97 |
| 4 | Cp-$C_6F_5$ on $Zr(SO_4)_2 \cdot 4H_2O$ 10% on SYLOPOL-2408, 120:1, 0.0305 mmol Ti/g | 90 | 30 | 79.9 | 2663 | 0.0305 | 65.2 |
| 5 | Cp-$C_6F_5$ on $Zr(SO_4)_2 \cdot 4H_2O$ 10% on SYLOPOL-2408, 90:1, 0.0305 mmol Ti/g | 90 | 31 | 101.8 | 3284 | 0.0305 | 93.9 |
| 6 | Cp-$C_6F_5$ on $Zr(SO_4)_2 \cdot 4H_2O$ 10% on SYLOPOL-2408, 90:1, 0.0305 mmol Ti/g | 90 | 30 | 61.9 | 2063 | 0.0305 | 90.6 |

Note:
0.0355 mmol of Ti per g of (total) catalyst is 0.044 mmol Ti per gram of support.
0.0305 mmol of Ti per g of (total) catalyst is 0.038 mmol Ti per gram of support.

The above examples are all comparative examples as the Cp ligand is only substituted by a $C_6F_5$ substituent.

Lowering the catalyst loading from 0.0355 mmol of Ti/g of (total) catalyst to 0.0305 mmol of Ti/g of (total) catalyst does not produce an immediate benefit to the productivity and the fouling rate.

For this catalyst fouling appears to depend on the amount of catalyst used.

TABLE 2

| Run | Catalyst on support and Al(MAO):Ti mole ratio | Rx Temp °C. | Amount of Catalyst mg | PE Yield g | Productivity g PE/g of catalyst | Catalyst loading mmol of Ti/g of cat | Fouling % |
|---|---|---|---|---|---|---|---|
| 1 | [1-nHex-2-C6F5-Cp][NPtBu3]TiCl2 on MAO SYLOPOL 2408 (90:1) | 90 | 20 | 81.0 | 4050 | 0.0355 | 56 |
| 2 | [1-nHex-2-C6F5-Cp][NPtBu3]TiCl2 on $Zr(SO_4)_2 \cdot 4H_2O$ on MAO/SYLOPOL 2408 (90:1) | 90 | 32 | 125.1 | 3909 | 0.0305 | 19.5 |
| 3 | [1-nHex-2-C6F5-Cp][NPtBu3]TiCl2 on $Zr(SO_4)_2 \cdot 4H_2O$ on MAO/SYLOPOL 2408 (90:1) | 90 | 28 | 104.5 | 3732 | 0.0270 | 28.4 |
| 4 | [1-nHex-2-C6F5-Cp][NPtBu3]TiCl2 on $Zr(SO_4)_2 \cdot 4H_2O$ on SYLOPOL 2408, temp study (90:1) | 100 | 29 | 51.7 | 1783 | 0.0305 | 75.4 |
| 5 | [1-nHex-2-C6F5-Cp][NPtBu3]TiCl2 on $Zr(SO_4)_2 \cdot 4H_2O$ on SYLOPOL 2408, temp study (90:1) | 80 | 28 | 70.5 | 2518 | 0.0305 | 33.8 |
| 6 | [1-nHex-2-C6F5-Cp][NPtBu3]TiCl2 on $Zr(SO_4)_2 \cdot 4H_2O$ on MAO/SYLOPOL 2408 (90:1) | 90 | 28 | 169.8 | 6064 | 0.0355 | 55 |
| 7 | [1-nHex-2-C6F5-Cp][NPtBu3]TiCl2 on $Zr(SO_4)_2 \cdot 4H_2O$ on/ MAO/SYLOPOL 948 (90:1) | 90 | 32 | 97.0 | 3031 | 0.0305 | lost |
| 8 | [1-nHex-2-C6F5-Cp][NPtBu3]TiCl2 on $Zr(SO_4)_2 \cdot 4H_2O$ on/ MAO/SYLOPOL 948 (90:1) | 90 | 28 | 111.7 | 3989 | 0.0355 | 34 |

TABLE 2-continued

| Run | Catalyst on support and Al(MAO):Ti mole ratio | Rx Temp °C. | Amount of Catalyst mg | PE Yield g | Productivity g PE/g of catalyst | Catalyst loading mmol of Ti/g of cat | Fouling % |
|---|---|---|---|---|---|---|---|
| 9 | [1-nHex-2-C6F5-Cp][NPtBu3]TiCl2 on $Zr(SO_4)_2 \cdot 4H_2O$ on MAO/SYLOPOL 2408 (90:1) | 90 | 25 | 103.7 | 4148 | 0.0305 | 13 |

Note:
0.0355 mmol of Ti per g of (total) catalyst is 0.044 mmol Ti per gram of support.
0.0305 mmol of Ti per g of (total) catalyst is 0.038 mmol Ti per gram of support.

SYLOPOL 948 has an average particle size ($D_{50}$) of 56 microns and SYLOPOL 2408 has an average particle size ($D_{50}$) of 40 microns.

Runs 3, 4, and 5 were a temperature study showing maximum productivity and lowest fouling at 90° C.

Runs 2, 3, and 9 show decreased fouling rates with adequate productivity at lower catalyst loadings.

Runs 2 and 7 show $Zr(SO_4)_2 \cdot 4H_2O$ treatment of the support increases productivity at conventional loadings.

Runs 8 and 9 show better productivity using SYLOPOL 2408 as the support.

TABLE 3

| Run | Catalyst on support and Al(MAO):Ti mole ratio | Rx Temp (°C.) | wt of Catalyst (mg) | PE Yield (g) | Productivity g PE/g of catalyst | Catalyst loading (mmol Ti/gcat) | % Fouling |
|---|---|---|---|---|---|---|---|
| 1 | (1-n-Pr, 2-$C_6F_5$)Cp(t-Bu3P=N)TiCl$_2$ on $Zr(SO_4)_2 \cdot 4H_2O$ on MAO/SYLOPOL 2408 (120:1) | 90 | 25 | 151.2 | 6048 | 0.0305 | n/a |
| 2 | (1-n-Pr, 2-$C_6F_5$)Cp(t-Bu3P=N)TiCl$_2$ on $Zr(SO_4)_2 \cdot 4H_2O$ on MAO/SYLOPOL 2408 (120:1) | 90 | 19 | 32.9 | 1732 | 0.0355 | 29 |
| 3 | (1-n-Pr, 2-$C_6F_5$)Cp(t-Bu3P=N)TiCl$_2$ on $Zr(SO_4)_2 \cdot 4H_2O$ on MAO/SYLOPOL 2408 (120:1) | 90 | 20 | 47.3 | 2365 | 0.0355 | 33 |
| 4 | (1-n-Pr, 2-$C_6F_5$)Cp(t-Bu3P=N)TiCl$_2$ on $Zr(SO_4)_2 \cdot 4H_2O$ on MAO/SYLOPOL 2408 (100:1) | 90 | 30 | 94.9 | 3163 | 0.0250 | 22 |
| 5 | (1-n-Pr, 2-$C_6F_5$)Cp(t-Bu3P=N)TiCl$_2$ on $Zr(SO_4)_2 \cdot 4H_2O$ on MAO/SYLOPOL 2408 (120:1) | 90 | 29 | 94.4 | 3255 | 0.0250 | 20 |
| 6 | (1-n-Pr, 2-$C_6F_5$)Cp(t-Bu3P=N)TiCl$_2$ on $Zr(SO_4)_2 \cdot 4H_2O$ on MAO/SYLOPOL 2408 (120:1) | 90 | 28 | 143.2 | 5114 | 0.0305 | 49 |
| 7 | (1-n-Pr, 2-$C_6F_5$)Cp(t-Bu3P=N)TiCl$_2$ on MAO/SYLOPOL 2408 (90:1) | 90 | 26 | 85.1 | 3273 | 0.0305 | 14 |
| 8 | (1-n-Pr, 2-$C_6F_5$)Cp(t-Bu3P=N)TiCl$_2$ on MAO/SYLOPOL 2408 (90:1) | 90 | 25 | 81.6 | 3264 | 0.0355 | 15 |

Note:
0.0355 mmol of Ti per g of (total) catalyst is 0.044 mmol Ti per gram of support.
0.0305 mmol of Ti per g of (total) catalyst is 0.038 mmol Ti per gram of support.

Runs 1 through 5 were conducted suing SYLOPOL 2408 treated with $Zr(SO_4)_2 \cdot 4H_2O$ as a support and runs 6 through 8 were conducted using SYLOPOL 2408 as the support.

Runs 1, 2, and 3 show lower loading of the catalyst leads to higher productivity Runs 2 and 3 and 4 and 5 show lower loading of the catalyst on a support treated with $Zr(SO_4)_2 \cdot 4H_2O$ leads to higher productivity.

Lines 6, 7, and 8 show lower loading of the catalyst leads to higher productivity Example 2

A series of catalysts were tested using a continuous reactor substantially as described in the examples of EP 0 659 773 except that the there was no recycle back to the reactor. The reactions were conducted at 80° C. The feed rate of hexane to ethylene was fixed to provide a constant mole:mole input.

In the catalyst for runs 1 through 4, the phosphinimine ligand was $((t-butyl)_3PN)$, and the activatable atoms were chlorine. The penta fluoro phenyl cyclopentadienyl ligand ($C_6F_5$-Cp) was either unsubstituted or substituted at the 1 position with an n-hexyl or an n-propyl substituent. For runs 1, 2, and 3 the molar amount of hexene to ethylene was 0.014:0.019 and for run 4 the molar amounts of hexane to ethylene was 0.018:0.019. The results are shown in Table 4.

TABLE 4

| Run | Support | $Zr(SO_4)_2 \cdot 4H_2O$ wt % on the support | $C_6F_5$-CP Ligand substituents (1 position) | Al:T Molar ratio | Catalyst Loading MgTi:g of Catalyst | Productivity g PE/g Cat | Comments |
|---|---|---|---|---|---|---|---|
| 1 | SYLOPOL 2408 | Yes 15% | No | 120:1 | 0.0355 | 1476 | 11 line plugages chunks and ribbons of polymer in reactor |
| 2 | SYLOPOL 2408 | No | No | 120:1 | 0.0355 | 1765 | Catalyst would not light off without scavenger 12 plugs. |
| 3 | SYLOPOL 2408 | Yes 10% | n-hexyl | 90:1 | 0.0305 | 5410 | No plugs few chunks |
| 4 | SYLOPOL 2408 | Yes 10% | n-propyl | 120:1 | 0.0305 | 7303 | No plugs small amount (11.6 g total) of chunks in 4 Kg of polymer |

These runs demonstrate the results obtained using bench scale reactor are reproducible using a larger continuous reactor.

What is claimed is:

1. A supported phosphinimine catalyst having a productivity in a gas phase polymerization greater than 2500 g of polymer per gram of supported catalyst per hour normalized to 1379 kPag (200 psig) of ethylene partial pressure and a temperature of 90° C. as measured in a 2 liter reactor over a period of time from 0 to 60 minutes comprising:
 i) a calcined porous particulate inorganic oxide support having an average particle size from 30 to 80 microns, a surface area greater than 250 m²/g, and a pore volume greater than 0.3 ml/g; and
 ii) from 0.1 to 30 weight % based on the weight of said calcined support of an aluminum compound of the formula $$R^{12}{}_2AlO(R^{12}AlO)_qAlR^{12}{}_2$$

wherein each $R^{12}$ is independently selected from the group consisting of $C_{1-20}$ hydrocarbyl radicals and q is from 3 to 50; and
 iii) a phoshpinimine catalyst of the formula:

$$(L)_n\text{---}\underset{|}{\overset{(Pl)_m}{M}}\text{---}(Y)_p$$

wherein M is selected from the group consisting of Ti, Zr and Hf; PI is a phosphinimine ligand of the formula:

$$R^{21}\diagdown\!\!\!\!\diagup P=N\text{---}$$
$$R^{21}\diagup\quad R^{21}$$

wherein each $R^{21}$ is independently selected from the group consisting of a $C_{1-10}$ hydrocarbyl radicals; L is a monoanionic ligand selected from the group consisting of a cyclopentadienyl ligand which is substituted at the 1 position by a $C_{1-6}$ straight chained alkyl radical and at the 2 position by a $C_6F_5$ radical; Y is independently selected from the group consisting of activatable ligands; m is 1 or 2; n is 0 or 1; p is an integer and the sum of m+n+p equals the valence state of M;
 to provide from 0.020 to 0.031 mmol of M per g of catalyst and the weight ratio of aluminum from the aluminum compound to M from the phosphinimine catalyst from 50:1 to 150:1.

2. The catalyst according to claim 1, having a productivity of greater than 3500 per gram of supported catalyst per hour normalized to 1379 kPag (200 psig) of ethylene partial pressure and a temperature of 90° C.

3. The catalyst according to claim 2, wherein in the aluminum compound $R^{12}$ is a methyl radical and q is from 10 to 40.

4. The catalyst according to claim 3, wherein the weight ratio of aluminum from the aluminum compound to M from the phosphinimine catalyst is from 75:1 to 140:1.

5. The catalyst according to claim 4, wherein the cyclopentadienyl ligand is substituted in the 1 position with a radical selected from the group consisting of linear $C_{3-6}$ alkyl radicals.

6. The catalyst according to claim 5, wherein in the phosphiminime ligand each $R^{21}$ is the same and is selected from the group consisting of $C_{3-6}$ secondary and tertiary alkyl radicals.

7. The catalyst according to claim 6, wherein M is Ti.

8. The catalyst according to claim 7, wherein in the phosphinimine ligand $R^{21}$ is a tertiary butyl ligand.

9. The catalyst according to claim 1 having a fouling rate of less than 35%.

10. The catalyst according to claim 1, wherein the support has been impregnated with from 1 to 15 weight % of $Zr(SO_4)_2 \cdot 4H_2O$.

11. The catalyst according to claim 2, wherein the support has been impregnated with from 1 to 15 weight % of $Zr(SO_4)_2 \cdot 4H_2O$.

12. The catalyst according to claim 3, wherein the support has been impregnated with from 1 to 15 weight % of $Zr(SO_4)_2 \cdot 4H_2O$.

13. The catalyst according to claim 4, wherein the support has been impregnated with from 1 to 15 weight % of $Zr(SO_4)_2 \cdot 4H_2O$.

14. The catalyst according to claim 5, wherein the support has been impregnated with from 1 to 15 weight % of $Zr(SO_4)_2 \cdot 4H_2O$.

15. The catalyst according to claim 6, wherein the support has been impregnated with from 1 to 15 weight % of $Zr(SO_4)_2 \cdot 4H_2O$.

16. The catalyst according to claim 7, wherein the support has been impregnated with from 1 to 15 weight % of $Zr(SO_4)_2 \cdot 4H_2O$.

17. The catalyst according to claim 8, wherein the support has been impregnated with from 1 to 15 weight % of $Zr(SO_4)_2 \cdot 4H_2O$.

18. A gas phase polymerization conducted in the presence of a catalyst according to claim 1.

19. A gas phase polymerization conducted in the presence of a catalyst according to claim 9.

20. A slurry polymerization conducted in the presence of a catalyst according to claim 1.

21. A slurry phase polymerization conducted in the presence of a catalyst according to claim 9.

* * * * *